United States Patent
Williams et al.

[11] Patent Number: 5,913,337
[45] Date of Patent: Jun. 22, 1999

[54] SPOOLABLE COMPOSITE TUBULAR MEMBER WITH ENERGY CONDUCTORS

[75] Inventors: Jerry G. Williams, Ponca City, Okla.; Alex Sas-Jaworsky, Houston, Tex.

[73] Assignee: Fiber Spar and Ture Corporation, West Wareham, Mass.

[21] Appl. No.: 08/974,516

[22] Filed: Nov. 19, 1997

Related U.S. Application Data

[63] Continuation of application No. 08/350,283, Dec. 6, 1994, abandoned, which is a continuation-in-part of application No. 07/950,386, Sep. 22, 1992, abandoned, which is a continuation-in-part of application No. 07/495,010, Mar. 15, 1990, Pat. No. 5,176,180, and a continuation-in-part of application No. 07/803,838, Dec. 9, 1991, abandoned.

[51] Int. Cl.$^6$ .................................................. F16L 11/02
[52] U.S. Cl. ........................... 138/125; 138/130; 138/132; 138/144; 138/153; 138/174
[58] Field of Search ..................................... 138/103, 108, 138/111, 115, 119, 120, 121, 125, 130, 132, 140, 148, 144, 153, 172, 174

[56] References Cited

U.S. PATENT DOCUMENTS

| | | |
|---|---|---|
| 2,690,769 | 10/1954 | Brown . |
| 2,810,424 | 10/1957 | Swartswelter et al. . |
| 3,856,052 | 12/1974 | Feucht ..................................... 138/119 |
| 4,200,126 | 4/1980 | Fish . |
| 4,241,763 | 12/1980 | Antal et al. . |
| 4,248,062 | 2/1981 | McLain et al. . |
| 4,261,390 | 4/1981 | Belofsky . |
| 4,303,457 | 12/1981 | Johansen et al. . |
| 4,515,737 | 5/1985 | Karino . |
| 4,657,795 | 4/1987 | Foret . |
| 5,170,011 | 12/1992 | Martucci . |
| 5,351,752 | 10/1994 | Wood et al. . |
| 5,551,484 | 9/1996 | Charboneau ............................ 138/104 |
| 5,613,523 | 3/1997 | Klawuhn et al. ........................ 138/153 |
| 5,758,694 | 6/1998 | Friedrich et al. ........................ 138/144 |

FOREIGN PATENT DOCUMENTS

| | | |
|---|---|---|
| 0 024 512 | 3/1981 | European Pat. Off. . |
| 4214 383 C1 | 9/1993 | Germany . |
| 553110 | 5/1943 | United Kingdom . |
| 1037959 | 8/1966 | United Kingdom . |

OTHER PUBLICATIONS

Sas–Jaworsky, A., and Williams, J.G., "Development of Composit Coiled Tubing for Oilfield Services'", *Society of Petroleum Engineers, Inc.*, SPE paper No. 26536 presentation at the 68th Annual Technical Conference and Exhibition, Houston, Texas, Oct. 3–6, 1993.

Sas–Jaworsky, A., and Williams, G., "Enabling Capabilities and Potential Applications of Composite Coiled Tubing", *Proceedings of World Oil Second International Conference on Coiled Tubing Technology*, Houston, Texas, 1994, Mar. 29–31.

(List continued on next page.)

*Primary Examiner*—Denise L. Ferensic
*Assistant Examiner*—James F. Hook
*Attorney, Agent, or Firm*—Lahive & Cockfield, LLP

[57] ABSTRACT

A composite tubular member having an outer generally cylindrical member containing fibers oriented to resist internal and external pressure and provide low bending stiffness, and two inner areas of axial reinforcement located near the neutral axis of the composite tubular members containing fibers oriented to provide high axial stiffness, high tensile strength and low bending stiffness; and fibers oriented to resist shear stress, positioned opposite each other within the walls of the outer member. These inner areas define a minor moment of inertia of bending extending diametrically through said inner areas and a major moment of inertia of bending generally orthogonal to said minor moment of inertia. Energy conductors integral to the tubular member are arranged in a plane along the minor moment of inertia formed in the tubular member.

25 Claims, 5 Drawing Sheets

OTHER PUBLICATIONS

Sas–Jaworsky, A., and Williams, G., "Advanced Composite Enhance Coiled Tubing Capabilities", *World Oil,* Apr. 1994, pp. 57–69.

Sas–Jaworsky, II, A., and Teel, M.E., "Coiled Tubing 1995 Update: Production Applications", *Proceedings of World Oil's Third International Conference, and Exhibition on Coiled Tubing Technology,* Houston, Texas, 1995, Mar. 13–16 pp. 97–105.

SPOOLABLE COMPOSITE TUBULAR MEMBER WITH ENERGY CONDUCTORS

This application is a continuation of U.S. patent application Ser. No. 08/350,283, now abandoned Dec. 6, 1994, which is a continuation-in-part of U.S. patent application Ser. No. 07/950,386 filed Sep. 22, 1992, now abandoned and entitled "Spoolable Composite Tubular Member With Energy Conductors", which is a continuation-in-part of U.S. patent applications Ser. No. 07/495,010 filed Mar. 15, 1990 and entitled "Composite Tubular Member With Axial Fibers Adjacent The Side Walls", now U.S. Pat. No. 5,176,180, and Ser. No. 07/803,838 filed Dec. 9, 1991 and entitled "Spoolable Composite Tubular Member With Energy Conductors" now abandoned. The contents of all of the aforementioned applications and patents are hereby incorporated by reference.

BACKGROUND OF THE INVENTION

Coiled steel tubing finds a number of uses in oil well operations. For example, it is used in running wireline cable down hole with well tools, such as logging tools and perforating tools. Such tubing is also used in the workover of wells, to deliver various chemicals downhole and perform other functions.

Steel coiled tubing is capable of being spooled because the steel used in the product exhibits high ductility (i.e. the ability to plastically deform without failure). The spooling operation is commonly conducted while the tube is under high internal pressure which introduces combined load effects. Unfortunately, repeated spooling and use causes fatigue damage and the steel coiled tubing can suddenly fracture and fail. The hazards of the operation and the risk to personal and the high economic cost of failure in down time to conduct fishing operations forces the product to be retired before any expected failure after a relatively few number of trips into a well. The cross section of steel tubing expands during repeated use resulting in reduced wall thickness and higher bending strains with associated reduction in the pressure carrying capability. Steel coiled tubing is limited as to internal pressures up to about 5000 psi. Higher pressures significantly reduce the integrity of the tubing so that it will not sustain continuous flexing and thus severely limit its life, even to a single field application.

It is therefore desirable to provide a non-steel coil tubing which is capable of being deployed and spooled under borehole conditions, which does not suffer from the limitations of steel tubing and is highly resistant to chemicals.

Additionally, present steel coiled tubing logging operations sometimes utilize a wireline cable inserted within the bore of the coiled tubing to transmit data, or when real time data is not required, a logging tool capable of collecting and storing data downhole. When real time data is required, a dedicated reel of coiled tubing is used with the wireline permanently installed in the tubing. This takes up substantial cross-sectional space within the tubing and thus renders the coiled tubing unsuitable for other operations requiring a flow path or open bore through the tubing. Fluids are sometimes transported from the surface to a downhole location through the tubing to provide means for treating formations or for operating a mud motor to drill through the formations. In addition, it may be desirable to pump devices through the coiled tubing bore to a downhole location for various operations. Therefore, an open bore within the coiled tubing is essential for many operations and for this reason it is desirable not to have electrical conductors or the like positioned within the open bore portion of the tubing.

External pressures on the coiled tubing are also a major load condition and can be in excess of 2500 psi.

THE PRIOR ART

U.S. Pat. No. 3,554,284 to Nystrom teaches the use of a logging cable in which two inner layers of fibers are wound at ±18° and two outer layers are wound at ±35°.

U.S. Pat. No. 4,255,820 to Rothermel et al. discloses a prosthetic ligament formed with a densely woven cylindrical core that provides the axial stiffness for the prosthesis.

U.S. Pat. No. 4,530,379 to Policelli teaches a composite fiber tubing with a transition to a metallic connector. The fibers may be graphite, carbon, aramid or glass. These fibers, in one embodiment, are alternatively laid in ±15° orientations to the longitudinal axis. In the FIG. 4 embodiment, "a wider choice of axial angles of filaments in the layers" is permitted. Further, "This embodiment can be employed in a fluid conveyance pipe having bending loads in addition to internal pressure loads and in structural members having bending and axial stiffness requirements". Policelli suggests that the fiber angles can be selected in a range between 5° and 75° as measured from the axis.

U.S. Pat. No. 4,556,340 to Morton discloses the use of an externally mounted strip on a flexible pipe. The strip may be of any material having large axial stiffness in tension and low axial stiffness in compression. The strip provides "brased bending" (or preferred axis bending).

U.S. Pat. No. 4,728,224 to Salama discloses a composite mooring tendon on interspersed layers of carbon fibers and aramid fibers, the fibers being axial or low angle helical wrap. A layer of 90° wrap fibers can be provided as an external jacket.

U.S. Pat. No. 4,336,415 to Walling shows a composite flexible tubing assembly for wellbore use with provisions for conveying production fluids and electrical power conduits.

U.S. Pat. No. 3,604,461 to Matthews is concerned with a multiple layer high pressure hose which. can slip at the core, i.e. on the inner liner, but be tightly bound at the periphery. The layers of strands are cross plied to one another and are arranged to prevent the migration of the bonding agent through the layers to ultimately prevent the liner from being attached to the outer fibrous layers. The structure of strand layers is thus arranged to move relative to the liner or inner tube of the hose.

U.S. Pat. No. 3,856,052 to Feucht shows a flexible hose with reinforced portions in the sidewalls and parallel to the longitudinal axis to provide longitudinal tensile strength. This makes the hose easily collapsible through one axis and capable of being easily reeled upon itself.

U.S. Pat. No. 646,887 to Stowe et al. has a conductor(s) incorporated in one side-wall of a hose.

For the most part prior-art tubular structures that are designed for being spooled and also for transporting fluids, are made as a hose whether they are called a hose or not. For example the Feucht structure in U.S. Pat. No. 3,856,052 has longitudinal reinforcement in the side walls to permit a flexible hose to collapse preferentially in one plane; however the structure is a classic hose with vulcanized polyester cord plies which are not capable of carrying compression loads or high external pressure loads. Hoses typically use an elastomer such as rubber to hold fibers together but do not use a high modulus plastic binder such as epoxy. Hoses are designed to bend and carry internal pressure but are not normally subjected to external pressure or high axial compression or tension loads. For an elastomeric type material such as used in hoses the elongation at break is so high (typically greater than 400 percent) and the stress-strain response so highly nonlinear; it is common practice to define a modulus corresponding to a specified elongation. The modulus for an elastomeric material corresponding to 200 percent elongation typically ranges from 300 psi to 2000 psi. The modulus of elasticity for typical plastic matrix material used in a composite tube is from 100,000 psi to 500,000 psi or greater, with representative strains to failure of from 2 percent to 10 percent. This large difference in modulus and strain to failure between rubber and plastics and thus between hoses and composite tubes is what permits a hose to be easily collapsed to an essentially flat condition under relatively low external pressure and eliminates the capability to carry high axial tension or compression loads while the higher modulus characteristic of the plastic matrix material used in a composite tube is sufficiently stiff to transfer loads into the fibers and thus resist high external pressure and axial tension and compression without collapse. The procedure to construct a composite tube to resist high external pressure and compressive loads involves using complex composite mechanics engineering principles to ensure that the tube has sufficient strength. It has not been previously considered feasible to build a truly composite tube capable of being bent to a relatively small diameter, and be capable of carrying internal pressure and high tension and compression loads in combination with high external pressure requirements. Specifically a hose will not sustain high compression and external pressure loads.

Matthews U.S. Pat. No. 3,604,461 on the other hand shows a tubular member for carrying relatively high internal pressures but is still a hose made up of layers of fiber strands that are joined to adjacent strand turns. The strands and layers are attached by an adhesive but the adhesive does not impregnate the fibers so that the adhesive does not penetrate to the plastic core. Matthews teaches to position the strands so that they do not shift relative to one another but flexibility would be impaired if the adhesive surrounded the fibers and layers. If the fibers are not individuallyencapsulated by the matrix, the fibers do not have the capability to carry significant compressive or external pressure loads, a characteristic which is essential to performance of the invention in coiled tubing applications which requires bending as well as pushing on the tube and the ability to withstand external pressure. In this regard Matthew teaches that the liner must not be bonded to the hose. The Matthews structure would permit high external pressures to penetrate to the liner plastic core and collapse it.

The references which show the use of electrical conductors in a hose do so by making them inclusions in the walls of the hose and not as integral structural members which function to strengthen the hose or provide it with particular structural qualities. The electrical and optical conductors as positioned at or near the minimum moment of inertia to isolate them from significant bending strains imposed during bending were they positioned elsewhere. The prior art hoses with conductors are not particularly concerned with protection of the conductors from bending forces imposed by spooling the hose since the hose can be flattened to reduce the effect of bending. In the current invention, the tube must stay generally circular and be able to resist collapsing as high bending strains are imposed during spooling and as the tube buckles as it is pushed into the wellbore.

THE INVENTION

In accordance with the invention, composite tubing is provided for borehole operations such as for use in well logging and workover operations in oil wells. The tubing which is preferably spoolable comprises a composite tubular member having an outer composite structure containing high strength and stiffness fibers embedded in a resin material such as epoxy. The fibers are oriented to resist internal and external pressure and provide low bending stiffness. Two inner areas within the outer structure are located near the neutral axis of the composite tubular member and positioned in diametrically opposite walls of the outer composite structure to provide selective reinforcement within these opposite walls. The inner areas define a minor moment of inertia of bending extending diametrically through the inner areas and a major moment of inertia of bending generally orthogonal to the minor moment of inertia, the inner areas including composite structures oriented along the axis of the tube to provide high axial stiffness and strength to the outer tubular member such that the composite tubular member has significantly greater bending stiffness about the major axis as compared to the bending stiffness about the minor axis thereby providing a preferred direction of bending for the composite tubular member when spooled and unspooled. The arrangement of fibers or other structural material in said inner areas is oriented to provide high axial stiffness, high compressive and tensile strength and low bending stiffness and to resist shear stress. Fibers of high strength and modulus are embedded and bonded into a matrix that keeps the fibers in position, acts as a load transfer medium and protects the fibers from environmental damages. The plastic binder in which the fibers are embedded to form the matrix will have a modulus of elasticity (hereinafter modulus) that exceeds 100,000 psi. The liner also serves as a pressure containment member to resist leakage of internal fluids within the tubing. The liner in one configuration has a circular bore which is required in some downhole operations. In another configuration the liner is made concave to accommodate selective reinforcement members in the sidewall of the outer structure which in turn permits the outer surface of the composite coiled tubing to be substantially circular.

The outer composite structure is comprised of layers or plies of oriented fibers embedded as described in a matrix, which outer composite structure is bonded to a liner so that the liner is integrally attached to the outer composite structure to prevent external pressures from being applied directly to the outer surface of the liner, to thereby prevent collapse of the liner. Additionally, energy conductors including electrical wiring or fiber optics may be made integral to the tubular member, and also arranged to augment the desired physical characteristics of the tubing. Energy conductors commonly have low strain capability and thus can be damaged easily by large deformation such as imposed by bending. Placement of the energy conductors within the inner area ensure that the energy conductors are not exposed to significant bending strains.

DETAILED DESCRIPTION OF THE INVENTION

Figure 1:
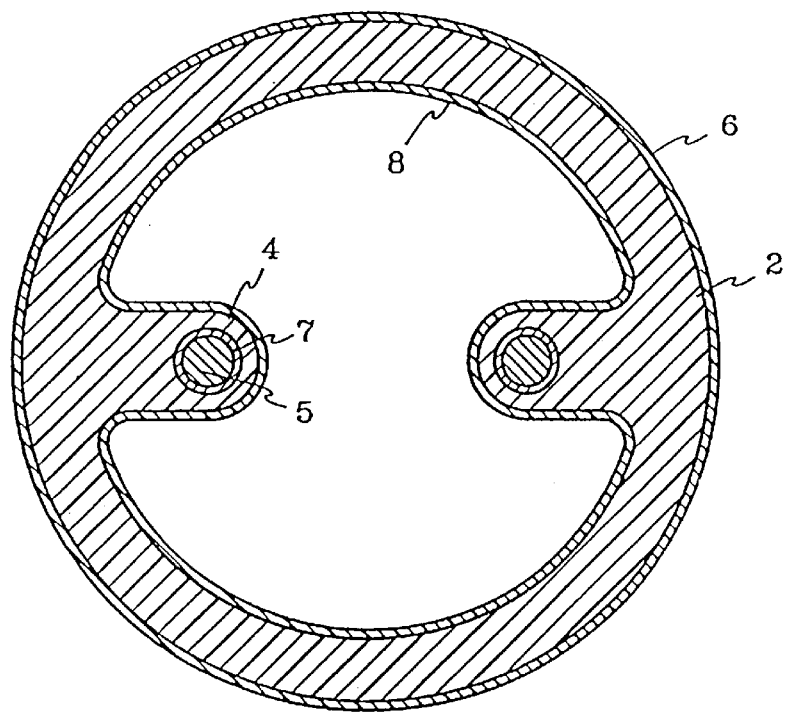
FIG. 1 is a schematic cross-sectional view of a composite tubular member containing oppositely disposed inner members with integral electrical conductors.
Figure 2:
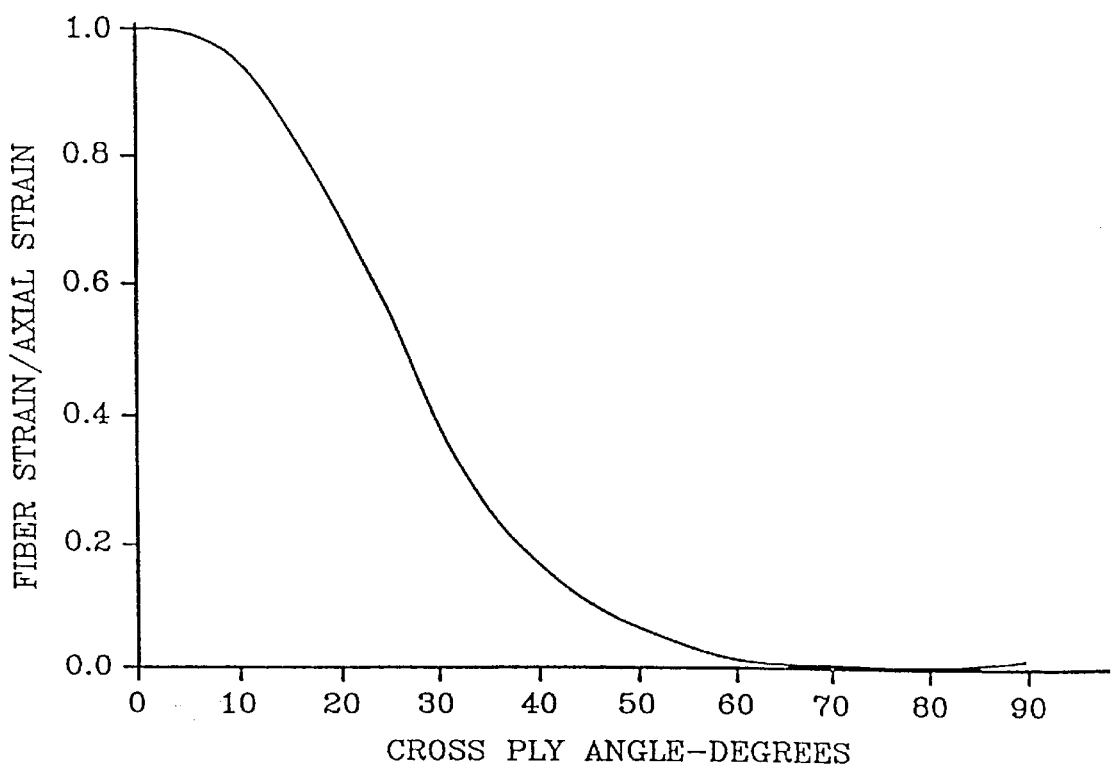
FIG. 2 is a graph showing reductions in the ratio of the strain in the fiber direction to the imposed axial strain as a function of increasing the cross-ply angle for a laminate made of high strength graphite fiber.

Composite fibers (graphite, Kevlar, fiberglass, boron, etc.) have numerous assets including high strength, high stiffness, light-weight, etc., however, the stress strain response of composite fibers is linear to failure and therefore non ductile. Composite coiled tubing must therefore address the strain limitations in another manner, i.e., by providing a construction to meet the requirements with a near elastic response or with large deformations of the matrix. Such a composite arrangement must have high resistance to bending stresses and internal pressure and external pressure. It must also have high axial stiffness, high tensile and compressive strength and be resistant to shear stress. All of these properties are combined in the composite tubular member of the invention to provide a coiled tubing which can be bent to a radius compatible with winding onto a reasonable size spool.

P. K. Mallick in the text book entitled *Fiber-Reinforced Composites, Materials, Manufacturing and Design*, defines a composite in the following manner: "Fiber-reinforced composite materials consist of fibers of high strength and modulus embedded in or bonded to a matrix with distinct interfaces (boundary) between them. In general, fibers are the principal load-carrying member, while the surrounding matrix keeps them in the desired location and orientation, acts as a load transfer medium between them, and protects them from environmental damages due to elevated temperatures and humidity, for example". This definition defines composites as used in this invention with the fibers selected from a variety of available materials including carbon, aramid, and glass and the matrix or resin selected from a variety of available materials including thermoset resin such as epoxy and vinyl ester or thermoplastic resins such as polyetheretherketone (PEEK), polyetherketoneketone (PEKK), nylon, etc. Composite structures are capable of carrying a variety of loads in combination or independently, including tension, compression, pressure, bending, and torsion.

Webster's Ninth New Collegiate Dictionary defines hose as "a flexible tube for conveying fluids". By comparison, a hose is distinctly different from a composite tube. Hose products such as umbilical lines used in subsea application are constructed of high strength fibers such as aramid, dacron, or nylon laid down in a geodesic patter onto a substrate plastic liner tubular structure. Alternatively, a hose may be constructed of high strength fibers with a low modulus binder such as rubber. In either case, a hose is designed to carry pressure loads and to exhibit good bending flexibility, but a hose has very limited ability to carry compressive, tension and torsion loads or external pressure.

The composite tube described in this invention can not only carry high internal pressure but can also carry high compressive, tension and torsion loads, independently or in combination. Such capability is essential if the tubing is to be used for applications such as coiled tubing in which the tubing is pushed into a high pressure reservoir and to overcome the friction to movement within the well bore, especially for highly deviated or horizontal wells. In addition, the tube is required to carry its own weight as it is suspended for 20,000-feet or more in a wellbore and to be able to have high pulling capability to extract tools or to overcome being stuck from sand and circulating solids which have collapsed around the tube. Such loads in the case of coiled tubing in deep wells can be in excess of 20,000 pounds. In other applications the tubing must also be capable of carrying high torsional loads. It was not considered feasible until the development represented in the current patent application, that one could design and build a composite tube capable of being bent to a relatively small diameter such as required for coiled tubing spooling and simultaneously be capable of carrying internal pressure and other loads.

It is also important in the spoolable pipe coiled tubing application that the liner be integrally attached to the composite structure. The necessity for a bonded liner is that in certain operating conditions experienced in downhole service, the external surface of the tube will be subjected to higher pressure than the interior of the tube. In addition, loading and bending of the tube may introduce microscopic cracks in the laminate which could serve as microscopic conduits for the introduction of external pressure to be applied directly to the outer surface of the liner. If the liner is not bonded to the structure, the external surface of the liner which cannot resist high pressures will be exposed to such high external pressure, which in turn will result in the collapse of the liner. A non bonded liner might be able to resist for example external pressures in the range of a hundred psi but not resist pressures in excess of 1000 psi which may typically be applied in the present coiled tubing application.

The present invention is best described by reference to the drawings. FIG. 1 shows a cross-sectional view of a composite tubular member which is made up of a composite outer member 2 which may be of a generally cylindrical shape and two composite inner members 4 which form inner areas within the tubular member, wherein a hypothetical diametrical line drawn through the inner members defines a minimum moment of inertia. Composite cylindrical member 2 contains fibers which are in cross-plied layers and oriented at from ±35° to ±70° to the axis of the tubular member. The (±) signifies opposite orientation of the fibers at the degrees indicated. This orientation of the fibers is selected from a range to provide achievement of structural efficiency for outer generally cylindrical member 2 when such member is subjected to various combinations of loading imposed by bending, tension, compression, torsion, and internal pressure. Outer member 2 may contain from about 5 to about 10 percent fibers which are oriented at approximately ±85 to 90°, that is, approximately perpendicular to the longitudinal axis of the composite tubular member. The inclusion of these circumferential fibers (85 to 90°) lowers the Poisson ratio of the composite tubular member toward 0.5 and increases the axial stiffness and makes load deformation response more linear and thus permits higher axial tension and compression loads. Circumferential fibers may in some applications be unnecessary. Again, these fibers are embedded in a matrix binder encapsulating the fibers and the layers of fibers into a unitary structure that comprises the cylindrical member 2.

The opposing inner composite members 4, which form the inner areas, contain fibers which are oriented at 0° to the longitudinal axis of the tubular member to meet the requirement for high axial stiffness, and high tensile and compressive strength are positioned near the axis of minor moment of inertia to impose only a small effect on the tube overall bending stiffness. One or more energy conductors 5, such as electrical or fiber optic cable, with optional insulative covering 7, may be positioned centrally within the inner areas 4 such that when the tube is bent about the axis of minor moment of inertia, minimal bending strains are imposed on the energy conductors. These conductors may be insulated if needed or they may depend on the composite fibers for electrical insulation from one another. Axial loading and thermal expansion may cause cracks in members 4, therefore it may be desirable to provide in these members, some fibers which are cross-plied and oriented at ±35° to ±70° to the axis of the tubular member, to provide resistance to delamination. The cross-ply oriented material which is resistant to shear loading may be provided either in the form of a woven fabric of braided material and is usually present in inner core members 4 in a amount between about 5 and 25 percent.

Figure 3:
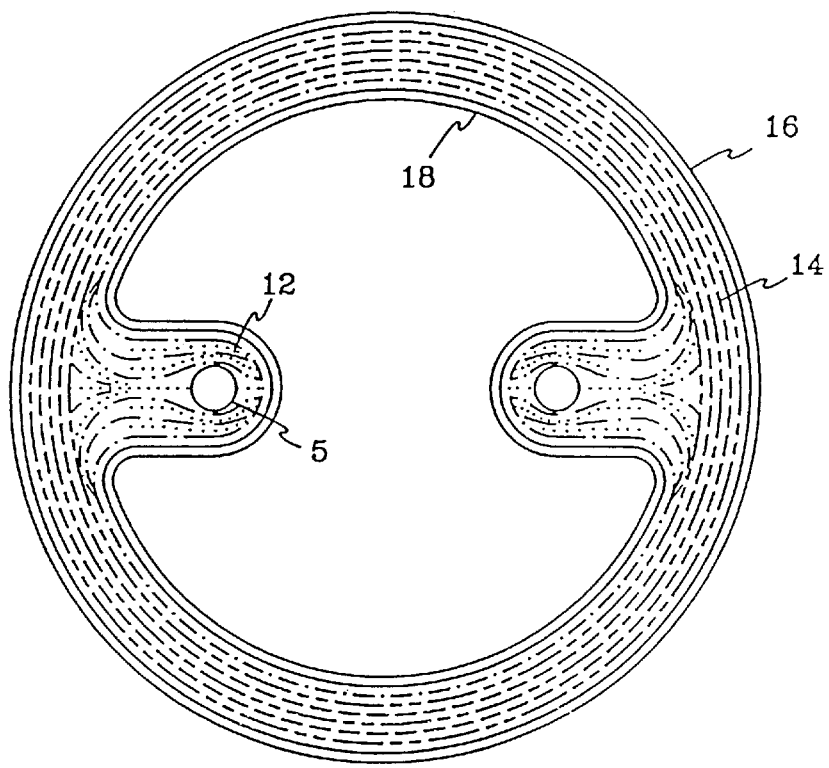
FIG. 3 is a schematic cross-sectional view of a composite tubular member showing the internal arrangement of fibers of differing angularities and electrical conductors.
Figure 8:
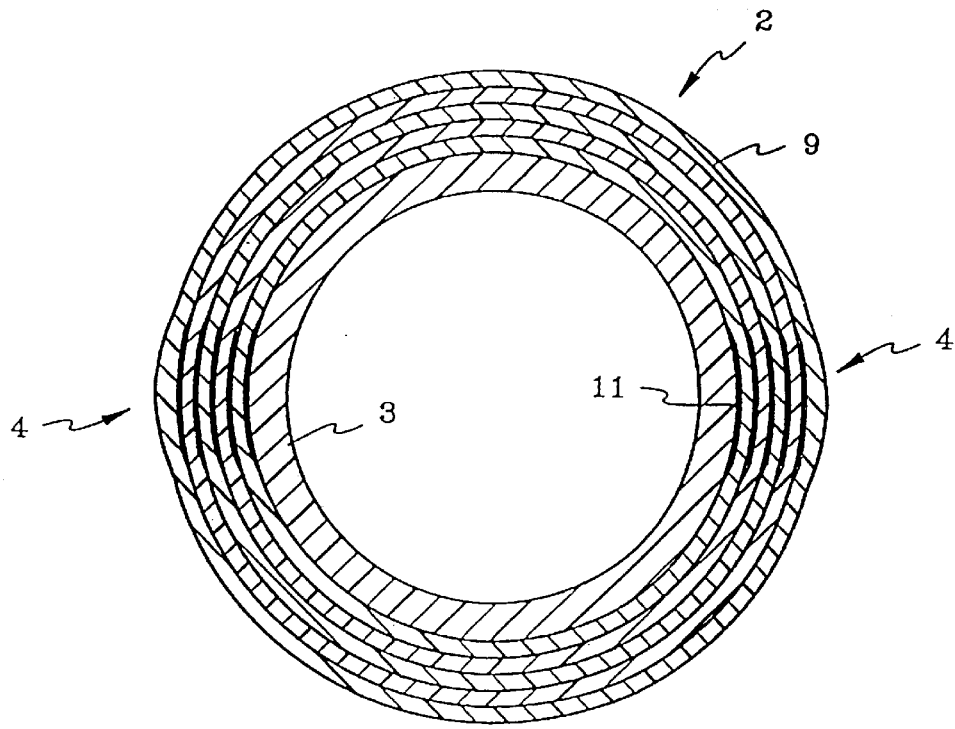
FIG. 8 is a schematic cross-sectional view of. a composite tubular member showing layers of fiber tape or tow interspaced between braided plies to define a moment of inertia of bending in the tubular member.
Figure 9:
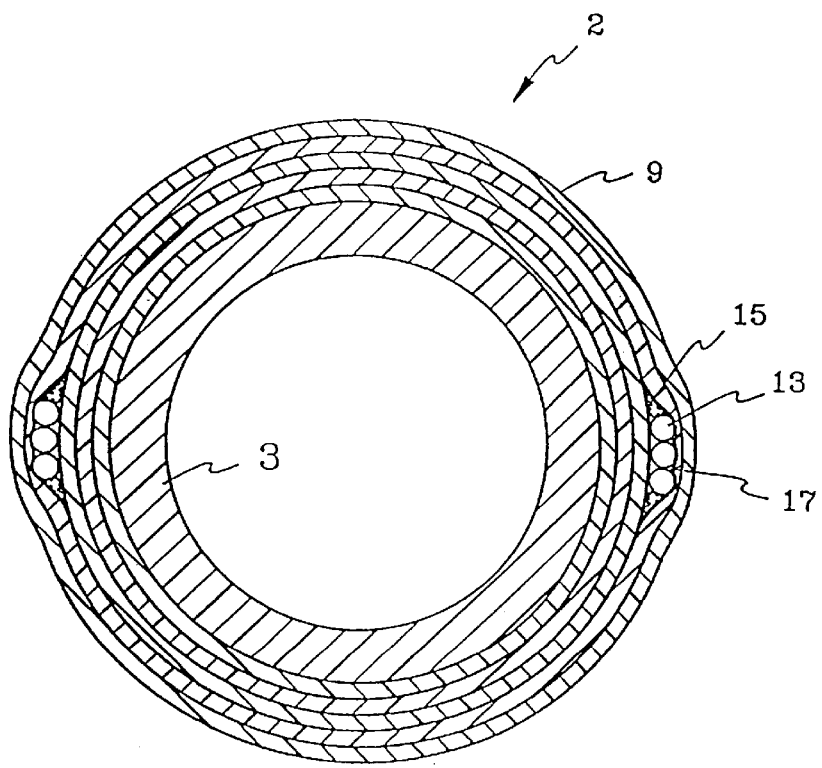
FIG. 9 is a schematic cross-sectional view of a composite tubular member having longitudinal uni-directional carbon rods underlying braided layers to define a moment of inertia of bending in the tubular member.
Figure 10:
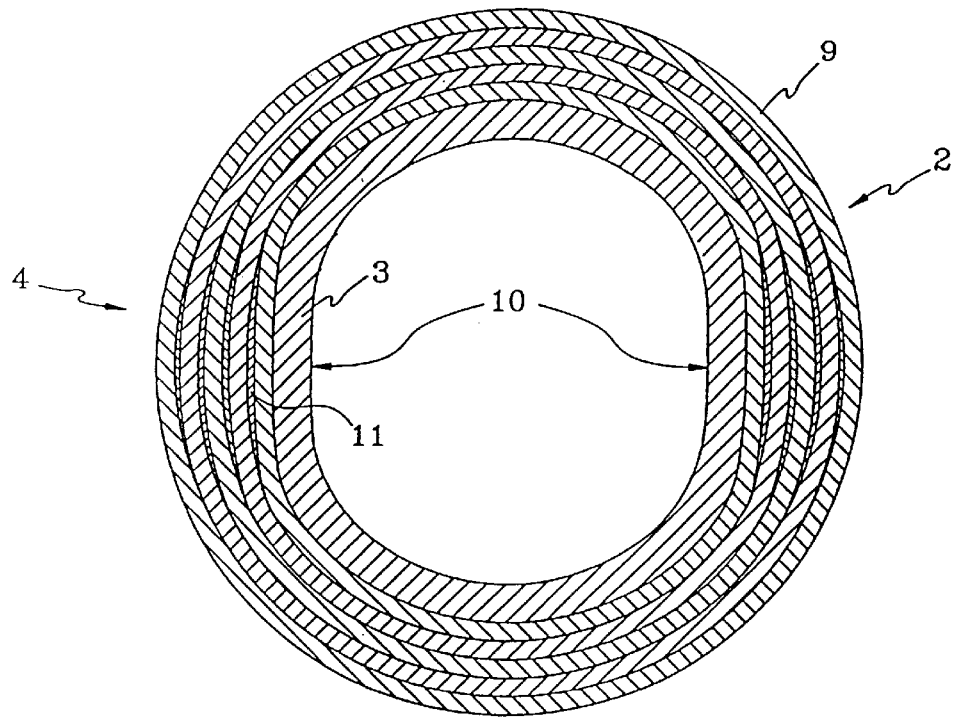
FIG. 10 is a cross-sectional view of a composite tubing having a circular outer diameter profile with the composite outer portion comprised of longitudinal reinforcing material interposed between adjacent layers of fibers, with the outer portion bonded to an elliptical inner liner.
Figure 11:
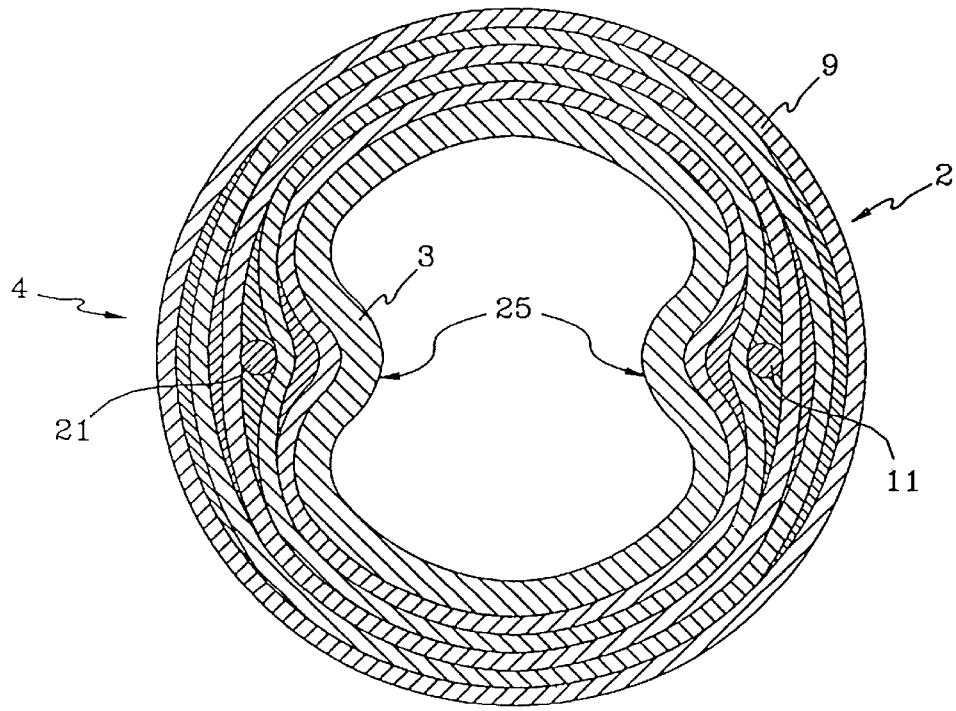
FIG. 11 is a cross-sectional view of a composite tubing having an inner liner with oppositely disposed convex surfaces and longitudinal reinforcing members including conductors disposed between adjacent laminates making up an outer composite portion.

The inner areas may be arranged so that core members 4 have protuberances near the inside wall of the outer tubular member 2, which protuberances are generally shaped like sine curves, as is shown in FIGS. 1, 3, and 11. To reduce the strain in the 0° oriented material during bending of tubular member 2, it is desirable to have this material forming the inner areas close to the axis of the minor moment of inertia of the tubular member cross-section. This is provided by placing the inner areas so that the 0° material is concentrated in diametrically opposite sides of the tubular member such as in the sinusoidal shape shown, in which the amplitude of the sine curve configuration may be a slight, protuberance such as shown in FIGS. 8 to 11 up to a more major protuberance as shown in FIGS. 1 and 3. The protuberance may be toward the inside of the tube such as shown in FIGS. 1, 2, 10, and 11 thus permitting the outside diameter of the tube to be circular or toward the outside of the tube such as shown in FIGS. 8 and 9 permitting the inside diameter of the tube to be circular. Good strength in shear and transverse tension of the 0° oriented material in its attachment to the outer composite generally cylindrical member 2 may be obtained by encapsulating the 0° oriented material with ±35 to ±70° cross-ply material and adhering the cross-ply material to the outer composite cylindrical member.

The fibers contained in the outer cylindrical member and the inner core members are held together with a plastic matrix binder including a thermoset resin such as vinylester or epoxy, or a thermoplastic resin. The outer composite structure is made up of layers of composite material which are braided or filament wound about a thermoplastic tubular liner member 8 such that the liner is integrally attached to the innermost layer or laminate of composite material. The attachment should be integral to the outer composite structure to ensure that it is sufficient to resist large transverse tensional forces and interlaminer shear stresses as opposed to a nonadhering kissing contact. Bonded attachment between the liner 8 and the entire outer composite structure 2 is important to prevent external pressure forces from being applied directly to the liner which would collapse the liner.

Economic, structural, damage tolerance, and manufacturing considerations may make it advantageous to use fibers of different materials and different resins for the two components of the composite tubular member. For example, the high stiffness and high strength requirements of the inner area members may best be met by using 0° graphite fibers. On the other hand, lower cost and higher strain to failure of glass fibers may make fiber glass the material of choice for the outer generally cylindrical member. Other fibers which also may be used are ceramic fibers, polymer fibers, for example, from Kevlar fibers which is a product of the Du Pont Company. Test results have also shown that when aramid (Kevlar) fiber is used in the construction of composite spoolable tubing that the tubing is highly resistant to damage and that ultimate failure modes are localized. For example, the damage sustained during burst tests with tubes constructed using aramid fiber reinforcement commonly exhibit damage only on one side of the tube with the failed tube exhibiting considerable residual tensile strength. Such a characteristic is of considerable value in retrieving a failed tubing from the bore hole. The plastic binders mentioned, among others, may be used in the preparation of the components of the composite tubular member from these materials.

The size of the various components in the composite tubular member will depend on the overall size of the member. If the composite tubular member is used as coiled tubing, it will usually have a diameter of from one-half inch to about 4 inches. A representative composite coiled tube might have a 1.5-inch outside diameter, a wall thickness of 0.25-inch and a corresponding inside diameter of 1.0-inch. The structural laminate would be on the order of 0.19-inch thick and the liner approximately 0.06-inch thick. Using the configuration shown in FIG. 8, the maximum diameter in the selective reinforcement region might be 1.6-inch and carbon/epoxy selective reinforcement bands would be approximately 0.3-inch wide.

Referring again to FIG. 1, it may be desirable to line the interior of the composite tubular member with an abrasion and chemically resistant liner material 8 to provide a pressure type chamber. Materials such as polytetrafluoroethylene (PTFE), polyvinyl chloride (PVC), polyethylene (PE), ethylene tetrafluoroethylene (ETFE), polyvinylidene fluoride (PVDF), nylon, polypropylene (PP), or polyetherether ketone (PEEK) may be used for this purpose. Coextrusions of two or more of these materials may also be desirable in certain applications. The seal provided by liner 8 confines fluids within the coiled tubing which may be under internal pressures as high as 10,000 psi or greater. The liner serves as a pressure containment member to resist leaking of any internal fluid materials and the outer composite layers provide the structural containment of the liner and thus any internal pressure loads therein.

In downhole service, the composite tubular member may buckle and at the points of buckling, impose a normal force on the walls of the casing or open hole. This force will create friction as the tubular member is moved down the hole. The exterior of the composite tubular member may be covered with a protective abrasion resistant cover 6 to resist such wear and friction. Here again materials such as polytetrafluoroethylene (PTFE), polyvinyl chloride (PVC), polyethylene (PE), ethylene tetrafluoroethylene (ETFE), polyvinylidene fluoride (PVDF), nylon, polypropylene (PP), or polyetherether ketone (PEEK) with or without fiber reinforcement may be used to form this protective covering.

The axial strain in the cross-plied fiber in the outer cylindrical member of the composite tubular member due to bending, is significantly lower than would be similarly placed 0° oriented fibers. Typical reductions in the ratio of fiber strain to the imposed axial strain for a cross-plied laminate as a function of the cross-ply angle are presented in the graph of FIG. 2 using representative properties of a high strength graphite fiber. It is noted that for angles greater than approximately 25° the fiber strain is less than half the axial strain imposed on the laminate and rapidly reduces for larger cross-ply angles. Orienting the fibers in the outer generally cylindrical member in the manner described herein, optimizes the ability of the composite tubular member to carry the imposed set of loads and minimizes the strain in the fibers due to bending. Minimizing the bending strain in the fibers permits larger diameters for the outer generally cylindrical member portion of the composite tubular member than would be otherwise possible for a specific spool size. Conversely a given diameter composite tubular member so tailored, can be wound onto a smaller diameter spool. The generally cylindrical shape of the composite tubular member is also well suited for introducing such member into the well with the chain drive mechanism which is normally used to force the tubular member downhole. The configuration of the composite tubular member of the invention wherein inner areas are formed in opposite side walls creates a major and minor moment of inertia and forces a preferred direction of bending. In effect, this forces the composite tubular member to wind onto a spool by bending about the minor moment of inertia. Downhole, the buckle pattern will be a mixed mode having one period associated with the minor moment of inertia and a longer, smaller curvature mode associated with the major moment of inertia. Another advantage of forcing the bending to always occur about the same axis is that any damage which may occur due to bending is isolated or localized to a particular region of the tube rather than being globally distributed throughout the tube. The absence of global damage accumulation will lead to longer service life for the coiled tubing. The advantage of the selective reinforcement configuration is that high stiffness and high strength material can be placed in the composite inner areas without imposing significant increase in the associated bending strains or sacrifice in the minimum radius of curvature permitted for spooling.

In FIGS. 3, 4, 5, and 6, the broken lines within the bodies of the tubulars indicate the orientation of the fibers in a layer of the tubular. In particular, the dotted lines indicate fibers oriented approximately parallel (0°) to the axis of the tubular. Lines formed by alternating dots and dashes indicate fibers oriented approximately ±35° to ±70° to the axis of the tubular. Lines comprised of long dashes separated by two short dashes indicate fibers oriented approximately ±35° to ±70° to the axis of the tubular. Finally, a purely dashed line indicates fibers oriented approximately 90° to the axis of the tubular. FIG. 3 illustrates the internal arrangement of the fibers for a composite tubular member such as that shown in FIG. 1. Referring to FIG. 3, the angularity of the various fibers in the composite tubular member is represented by single lines. Each line represents a ply or laminate of fibers 14. Reference number 16 designates the outer abrasive cover, and 18 the inner abrasion and chemically resistant liner for the composite tubular member. As shown in the drawing, the composite inner areas are made up of 0° oriented material and cross-plied material. The cross-plied fibers are usually contained in a woven fabric or braided form which as shown, may be extended from the inner areas to join them with the outer generally cylindrical member of the composite tubular member. For structural continuity and sealing, at least part of the cross-plied web material in the inner areas continued around the inner portion of the outer generally cylindrical member. The 0° oriented fibers may also be provided in cloth or fabric form, however, this material is usually present as rovings, i.e. bundles of fibers or tape. As pointed out previously, the outer composite cylindrical member contains layers 14 of primarily ±35° to ±70° cross-plied fibers with or without a small amount of ±85° to ±90° oriented fibers. The fibers in the composite tubular member are encapsulated in a suitable plastic binder (not shown in the drawing) to form a unitary structure which in turn is bonded to liner 18.

Figure 4:
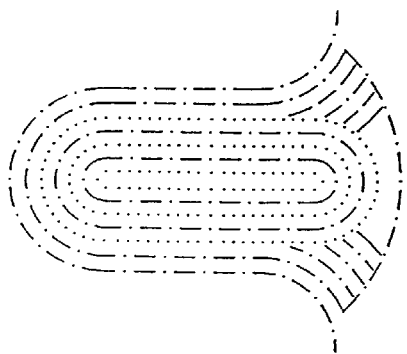
FIGS. 4, 5, and 6 are schematic cross-sectional views of the inner members of a composite tubular member showing alternative internal arrangements of the fibers.
Figure 5:
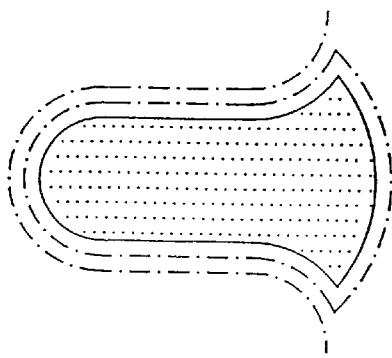
Figure 6:
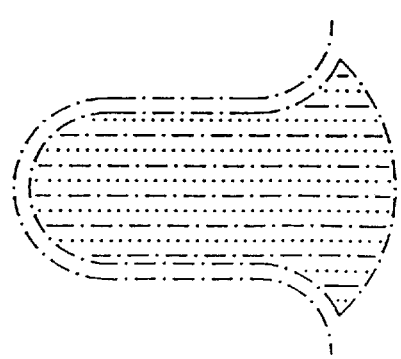

FIGS. 4, 5, and 6 show various internal arrangements of the fibers in the composite inner areas. The electrical conductors 5 have not been shown for sake of simplicity but would be positioned within a plane along the minor moment of inertia of the composite tubular member, as shown in FIG. 3 with fibers gradually forming around the conductors. In FIG. 4, the 0° and cross-ply oriented fibers are both shown in a generally elliptical configuration. In FIG. 5, the 0° oriented fibers represented by dots are concentrated in the inner portion of the core area. In FIG. 6, both the 0° oriented fibers and the cross-ply oriented fibers are arranged in a linear configuration which is parallel to the axis of the minor moment of inertia of the composite tubular member. in each of the arrangements shown in FIGS. 4, 5, and 6, both the sine wave portion and base portion of the inner area core members are enclosed by cross-ply oriented fibers which are continued entirely around the inner areas and onto the inner surface of the outer generally cylindrical composite member to resist shear stress and delamination.

The cross-ply fibers which are utilized in the inner composite areas in part are of the preferred orientation, however, it is within the scope of the invention to use fibers oriented from ±35° to ±70° in the inner areas to encapsulate the axial or 0° inner members. In addition, while ±45° oriented fibers are preferred for use in the outer generally cylindrical composite member for some design requirements, fibers oriented from ±35° to ±70° may be used without departing from the scope of the invention. The fiber sequence or stacking sequence of the ±45°, 0°, 90° and ±45° fiber orientations shown in the drawings is only representative and may be varied to meet specific design requirements.

The axial oriented material is needed for high axial strength and stiffness in a tube which is otherwise tailored to exhibit high pressure carrying capability and low bending stiffness. For spooling purposes a tube so designed will bend about the axis of the minimum moment of inertia without exceeding the low strain allowable characteristic of uniaxial material (compared to the high axial strain allowable for the layers of cross-plied lamina 14 (FIG. 3) which constitute the body of the tube), yet be sufficiently flexible to allow the assembly to be bent onto the spool. In such configuration the tube is made essentially circular on the inside with the unidirectional material integrated into the side wall, thus creating an upset on the outside of the tube rather than on the inside. Such unidirectional material may be provided in the form of circular rods (FIG. 9) located between the cross-ply layers which constitute the body of the tube. The rods may also be shaped to match the natural geometry which is developed by introduction of such an inclusion. Alternatively, unidirectional tape or roving (FIG. 8) may be positioned between the cross-plies of the tube. For a braided construction, the unidirectional material may be introduced as warp material as an integral part of the layers of the braid.

Alternative configurations of the invention are described by next referring to FIGS. 8 to 11 of the drawings. FIGS. 8 and 9 show an arrangement of coiled tubing construction alternative in which the selective reinforcement structural members forming an upset on the outer portions of opposite side walls of the outer generally cylindrical member 2. FIGS. 10 and 11 provide a generally circular configuration on the outside of the tube with a noncircular protrusion on the inside of the tube to accommodate the selective reinforcement, with both types of configuration providing the benefit of a minimum bending moment of inertia in the composite tubing.

In FIG. 8 the composite tubular member is comprised of an inner thermoplastic liner 3 to provide a body upon which to construct the tubular member and for providing a relative smooth interior bore within the tubular member. The liner serves the function of providing sealing against leakage of internal fluids under pressure. These pressures may be as high as 10,000 psi. Layers of braided or filament wound material such as Kevlar 49 and carbon encapsulated in a matrix material such as epoxy are applied as the outer generally cylindrical portion 2 of the tubular member. A pair of oppositely disposed inner areas 4 are formed within the outer generally cylindrical portion by placing layered strips 11 of carbon or other high stiffness in a material uni-directional fiber tape or the like between adjacent concentric layers 9 of the braided carbon/epoxy or filament wound material. As for the cylindrical portion 2, layered strips 11 also are encapsulated in a matrix material such as epoxy. Strips of carbon/epoxy tape 11, for example 0.3 inches wide, may be layered between perhaps 5 of the braided layers 9 forming the generally cylindrical outer portion 2. These tape strips 11 may be made up of say five layers of 0.005 in thick uni-directional fiber tape which would then make each layer 11 approximately 0.025 inches thick. This arrangement of interlayered tape strip forming inner areas 4 on opposite sides of the tubular member, is sufficient to define a minor moment of inertia of bending which extends diametrically through the inner areas and a major moment of inertia of bending generally orthogonal to the minor moment of inertia. These inner members or strips 11 which make up the inner areas are configured together with the other structural elements in the tubular member to provide high axial stiffness and strength to the outer portion of the tubular member such that the tubular member has greater bending stiffness about the major axis as compared to the bending stiffness about the minor axis to provide a preferred direction of bending about the axis of minimum bending stiffness when the tubular member is spooled and unspooled.

A further benefit of forcing the tube to bend about a single axis is associated with the accumulation of damage and wear which will naturally occur during thousands of strips on and off the spool. Repeated deployment with high internal pressure and high axial tension and compression loads will eventually lead to damage in the pipe and the need to retire or to reduce the allowable loads. If the tube is free to bend in any direction whatsoever, then the damage will be universal around the circumference of the tube, while if the damage is preferential such as will occur with selective reinforcement in which bending is forced to occur about the minimum bending moment of inertia, damage will be localized and result in longer life for the tubing.

Referring now to FIG. 9 of the drawings, the inner areas are provided in an alternative arrangement by arranging a plurality of high modulus fiber rods between adjacent braided or filament wound layers 9. Such rods are composed of carbon, boron, glass, etc. encapsulated in a matrix material such as epoxy or thermoplastic material such as PEEK. These rods are shown located between the fourth and fifth braided or filament wound carbon or aramid plies 9. More than one set of rods may be positioned between other cross-plied layers. The rods 13 may be on the order of 0.067 inches in diameter. A void 17 formed between the fourth and fifth plies by the spacing effect of the rods, may be occupied by a filler 15 such as uni-directional carbon or E-glass roving or strands encapsulated in a matrix in the region adjacent the outside rods in the array. It is important that the rods remain straight and in a fixed radial position in the outer generally cylindrical portion. This is to assure that the minimum bending moment of inertia will continue to be defined by the inner area within the structure, which comprises the rod 13 and filler 15 in the FIG. 9 embodiment.

The arrangements shown in FIGS. 8 and 9 provide for an upset 4 on the outer surface of the outer cylindrical member 2 so that the axial elements 11 and 13 respectively for selective reinforcement can be incorporated in the sidewall and still provide a liner 3 having a circular internal bore. Certain downhole operations require a substantially circular internal bore in a pipe string to facilitate the pumping of tools, for example through the pipe string. One example is the use of ball sealers that are used to seal casing perforations in various well treatment operations. The pumping of tools and plugs that require differential pressure across an apparatus also require a uniformly circular pipe bore for their application and operation. Thus, the incorporation of a circular internal bore in the coiled tubing string may be required in some applications.

The inner areas 4 of all the embodiments may be comprised of energy conductors (not shown in FIGS. 8 to 10) similarity to the configuration of the tubular member of FIGS. 1, 3 and 11. These energy conductors may be electrical or optical conductors or any material or substance capable of being modulated with information data. These energy conductor paths may also serve as part of the physical structure of the inner areas which form the minimum moment of inertia of bending within the tubular member. Of primary concern in placing the conductors in these inner areas is to insure that bending strains are minimal. When placed in the region of selective reinforcement the conductors are near the neutral axis of bending. If positioned elsewhere in the tube, bending strains may exceed the allowable resulting in breaking the conductors. This would be even more critical if the conductors were fiber optics.

Placement of conductors in the region of selective reinforcement will also provide additional stiffening. For example, a metallic conductor such as shown at 21 in FIG. 11 will provide a uni-directional longitudinal stiffening material in the opposite sidewalls which will provide axial stiffness together with compressive strength as well as tensile and shear strength. This reinforcement will help strengthen the coiled tubing for pushing into a pipe or the like, for pulling out of a pipe or hole, and will help provide a major and minor moment of inertia to promote preferential bending of the coiled tubing, while at the same time forming a structure that will not collapse thus maintaining a generally circular outer configuration which is required for purposes of feeding the tube through a pressure loaded stripper element at the well bore entrance.

Referring next to FIGS. 10 and 11 of the drawings, the outer composite layers 9 are comprised of fibers wound or braided in a desired orientation and bonded onto an inner liner 3. The fibers making up the layers 9 are embedded in a matrix which keeps them oriented and acts as a load transfer between the fibers. These fiber layers are intimately bonded to one another and to the liner 3 so that external pressure can not be carried from outside the tubing through fissures or voids in the outer composite layers directly to the outer surface of the liner 3 and thereby cause the liner to collapse. The arrangements of materials in FIGS. 10 and 11 is such that the outer surface of the composite tubing is substantially circular in spite of longitudinal reinforcing members in opposite side walls of the tubing. Whereas in FIGS. 8 and 9 the inclusion of reinforcing layers 11 have created an external bulging in the tubing side-walls, the configurations of FIGS. 10 and 11 are provided with shaped liners, which provide a built-in inner bulging of the sidewalls to provide a space for the members 11. In FIG. 10 the liner 3 is somewhat elliptical with oppositely disposed, relatively straight inner side wall portions 10 positioned adjacent the longitudinal reinforcing members 11. This shape provides a slightly greater wall thickness in these opposite side-walls at 10 which in turn provides the additional space needed to accommodate the longitudinal or uni-directional materials 11 making up the reinforcing in the opposite side walls and at the same time maintain a generally circular outer shape to the generally cylindrical member 2.

In FIG. 11, the inner liner is shaped to provide a concave inner wall 25 which also provides a thicker wall portion in the outer composite member adjacent such opposite inner walls 25 to accommodate the additional thickness caused by the build up of the uni-directional or stiffening material 11 interposed between layers 9.

Conventional stripper elements used in coiled tubing operations to seal across the well bore entrance have a circular cross-sectional profile. To accommodate the non-circular cross-section shown in FIGS. 8 and 9, the stripper element inside diameter must be manufactured to a similar configuration. In the alternative composite coiled tubing configuration shown in FIGS. 10 and 11, the tubing design is made to exhibit a circular outside diameter profile and thus be readily able to utilize a conventional coiled tubing stripper element. Incorporation of selective reinforcement 11 shown in FIGS. 3, 10 and 11 into a configuration with a circular outside diameter makes it necessary to provide the non-circular cross-section on the interior liner of the tube and thus thicken the opposite side-walls. This thicker cross-section is needed to accommodate the axially oriented 0° carbon/epoxy or other high stiffness fiber/matrix reinforcement material 11 forming an axis of minimum moment of inertia so that bending will naturally occur about a preferred axis.

The configuration of FIG. 11 is a variation of that shown in FIG. 10 in that liner 3 takes on the appearance of the numeral 8. This configuration also provides sufficient space in the side-wall to accommodate the additionally axially oriented 0° carbon/epoxy or other high stiffness fiber/matrix material. Such a configuration is needed when very high axial tension and compression loads are required such as for deployment of coiled tubing in very deep wells. The polymeric liner 3 can be extruded in the configurations shown in FIG. 10 or 11 and subsequently used as the foundation for the construction of the exterior composite structural composite wall 2. It is important for coiled tubing and other applications imposing external pressure loads that the liner be integrally bonded to the outer structural element to form a unitary structure and thus prevent external pressure from being directly applied to the outer surface of the liner 3.

Figure 7:
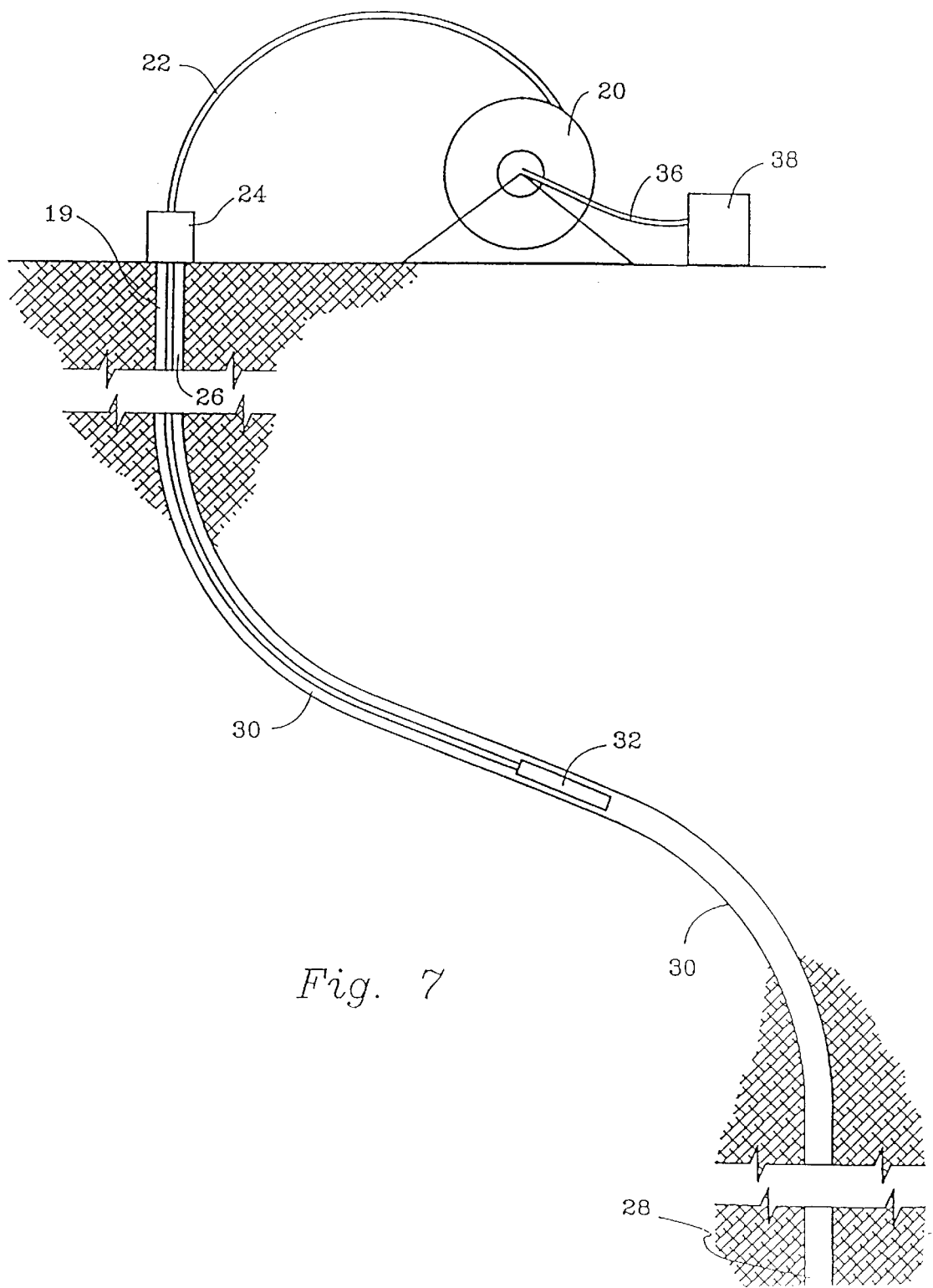
FIG. 7 is a schematic drawing illustrating the use of a composite tubular member in a wellbore operation.

Referring now to FIG. 7, a wellbore generally designated by the reference character 19 is shown. The wellbore has a vertical upper portion 26 extending to the surface, a vertical lower portion 28 and a deviated portion 30 connecting the upper and lower portions 26 and 28. The vertical portion 26 and the deviated portion 30 are normally several thousand feet in length while vertical portion 28 is usually much shorter. The wellbore may also terminate in a near horizontal section.

Arranged in operable relationship to the wellbore 19 and located on the surface is an injector assembly designated by the reference character 24. A reel 20 is also provided on the surface and the composite tubular member 22 is stored on this reel. Roller belts are frequently used as a guide in injector 24 and also to drive the composite tubular member down the hole. Contacts not shown are provided on the reel 20 to provide an electrical or optical connection between the conductors in the tubular member 22 and a surface cable 36 to thereby connect the downhole conductors 5, 21 in the tubular member 22 with a control system 38 at the surface.

Spool 20 and injector 24 are not detailed since these types of apparatus are well known in the art. For example, specific spool and injector arrangements are shown in U.S. Pat. Nos. 3,401,794; 3,722,594; and 4,682,657; among others.

After the apparatus shown in FIG. 7 has been assembled, the composite member 22 is extended through injector 24. The desired well tool such as a logging tool 32 is then attached to tubular member 22. An electrical connection is made between the well tool and the conductors 5, 21 integral to the tubular member 22. The well tool 32 is then placed in the upper portion 26 of well 18 and is lowered into the well by gravity. When well tool 32 reaches the deviated portion 30 of the well, the frictional engagement of the tool with the wall of this deviated portion is sufficiently great to overcome the force of gravity. When this occurs, injector 24 is used to apply downward force to the composite member such that the logging tool 32 is forced into and along the deviated section 30. In the event that the continuous application of force by injector 24 is not sufficient for this purpose, the injector may be operated to provide alternate upward and downward movement of the composite member and logging tool 32 in order to assure continued downward progress. Actuation of the logging tool at desired intervals is carried out by the control device 38 at the surface by way of the appropriate conductors 5, 21 placed within the composite member and electrically or optically connected to the logging tool 32.

When logging tool 32 leaves the deviated portion of the well and enters vertical portion 28 further hindrance to movement of the tool may occur. In this event, the procedure described may be repeated to provide further downward movement of the logging tool. It is seen that large compressional forces may be applied to a coiled tubing used in downhole service. Thus the axial stiffening that is provided is very important, which complicates the structural requirements for a spoolable pipe. Combining axial stiffness and low bending stiffness has led to the unique development set forth in this invention.

If a different type of well tool is being used other than logging tool 32, (for example, a perforating tool) the apparatus is connected and moved to the proper. zone or formation in wellbore 19 in the manner previously described. After reaching the desired zone, the appropriate switch or switches in the control device 38 may be operated to initiate the perforating tool by means of electrical circuits provided by conductors 5 (FIGS. 1 and 3) and conductors 21 (FIG. 11) contained within the composite tubular member. The composite tubular member having integral electrical conductors also offers a major advantage over prior coiled tubing operations. The placement of conductors in the wall of the tubular cable leaves a full open bore in the tubing which will permit the use of the tubular member as a full open fluid conduit for conducting downhole operations. Fluids and/or devices can be pumped through the tubular member to treat downhole formations, operate a mud motor for drilling or coring, or perform a variety of tests and operations with instruments and tools. These suggested uses are not intended to be limiting in this regard. At the same time, the opposite side-wall placement of conductors provides axial stiffness while also promoting preferential bending which helps to provide low bending stiffness.

In addition to its use in well logging and well workovers, the composite tubular members of the invention may be used in subsea hydraulic lines or as production tubing in which long sections of tubing are spooled and run downhole for permanent production. Production tubing is normally larger in diameter than is required of coiled tubing and may become too large to bend onto a practical diameter spool. If tubing diameters become too large for spooling, it is entirely feasible to manufacture the composite tubular members on site, onshore or offshore. Larger spool sizes are practical for offshore where the composite tubular member can be manufactured near a dock site. The presence of electrical or optical energy conductors in the tubing provides for operation of many downhole tools, as well as data acquisition from downhole or otherwise remote locations.

The obvious importance of the spooling characteristics of such a coiled tubing member is certainly central to this invention. It is found that with proper materials, orientation and arrangement thereof, a coiled tubing or cable can be constructed which is capable of being subjected to high strains which occur with spooling and unspooling and the loading imposed in the wellbore environment. In particular onshore well operations in the petroleum industry it is necessary to limit the size of spools because of transportation requirements in handling such spools. A spool having a diameter of 8 feet and a tubing having a diameter of 2 inches will result in a considerable strain imposed by the spooling operation. The arrangement of tubing structure disclosed in this application is an answer to needs resulting from this representative spooling situation.

Another benefit may be noted for using composite coiled tubular members. With composite coiled tubing, deformations are more elastic and usually larger than steel and this stored energy can be constructively used to help free the tubing from a stuck position or high friction bind. The pressure in the tubing can be pulsed to provide the foreseen function. Although this technique may have merit for steel coiled tubing as well as composite coiled tubing, the high stiffness of steel compared to the lower stiffness of the tubular members of this invention limits the magnitude of the local displacements associated with pressure pulsing steel tubing compared to displacements imposed using composite tubing. Activating a seal in the tubing down hole will permit pressure pulsing the composite tubing with a lower pressure imposed on the inside and the outside of the tubing. Pressure pulsing can also aid in freeing the coiled composite tubing stuck downhole.

In forming composite structures, several well known techniques may be used such as braiding, pultrusion, filament winding and molding. To make the multiple layers characteristic of the invention, a series of individual braiders or filament winding equipment is assembled in a row with each composite lamina layer positioned directly on top of previous lamina layer to build up the total thickness required with the resin material applied to each layer to ensure complete wet-out between fibers and between layers. This wet-out provides the ultimate unitary structure necessary to prevent the migration of pressure from the outer surface of the liner 3 (FIGS. 8 to 11) and liner 8 or 18 in FIGS. 1 and 3. In pultrusion, filaments or fibers are drawn through a resin impregnating apparatus, then through dies to provide the desired shapes, or alternatively, the resin may be injected within the dies. Finally, the desired product which is produced continuously may be wound onto a reel or spool. As an example, pultrusion is used in U.S. Pat. No. 4,416,329 to prepare a ribbon structure containing bundles of graphite fibers saturated with thermoplastic resin. The faces of the ribbon are covered with plies of woven material, such as glass fabric. Corner tows on the ribbon are made of Kevlar or glass. U.S. Pat. No. 4,452,314 used pultrusion to form arcuate sections comprised of glass filaments or other reinforcing material disposed in a thermosetting resin.

The composite tubular members of this invention may also be manufactured using pultrusion processes including either conventional pultrusion or pull winding equipment or pultrusion in combination with braiding or filament winding. In one procedure the 0° oriented material is pultruded in advance and guided into a like shaped recess on a pultrusion mold and subsequently pultruded jointly with the cross-ply material. Pultrusion can be used to make either continuous or discrete length composite tubular members. In the pull winding process, the 0° oriented material is either fed into the process as a prefabricated rod or fed into the assembly as a pre-preg tape or wet layout. Cross-ply material is then wound onto the tube and the assembly is pulled through a die for integral curing. The pultrusion process may utilize material which is prepared by weaving or braiding the fibers. Woven or braided material can be prepared as feed stock or can be fabricated on-line as a part of the pultrusion operation.

It is pointed out that while the various configurations of conductors shown herein may be described as electrical conductors, in some instances, to simplify the disclosure, it is contemplated that the terms such as conductor, energy conductor or conductor means encompass any sort of energy conductor such as electrical or fiber optic cables for powering devices or communicating signals. Similarly, while certain configurations of materials and types of materials have been described as forming the outer composite member 2 and the inner areas 4 which in the arrangement described form a moment of inertia of bending for the tubular member, it is apparent that materials, shapes and orientation thereof will provide this same benefit. Therefore, while certain embodiments and details have been shown for the purpose of illustrating the present invention, it will be apparent to those skilled in the art that various changes and modifications may be made herein without departing from the spirit or scope of the invention.

We claim:

1. A composite tubular member extending along an axis, said composite tubular member comprising a tubular composite layer containing cross-plied fibers contained within a binder for holding together said fibers, about 90 to about 95 percent of said fibers being oriented at approximately ±40° to approximately ±70° relative to the axis of the tubular member, and substantially impermeable material lining the inner surface of said composite tubular member thereby forming a pressure chamber.

2. A composite tubular member according to claim 1, wherein about 90 to about 95 percent of said fibers are oriented at approximately ±55° elative to the axis of the tubular member.

3. A composite tubular member according to claim 1, further comprising an energy conductor integrally positioned within said composite layer and extending along the axis.

4. A composite tubular member according to claim 1, further comprising an abrasion resistant outer cover covering said composite layer.

5. A composite tubular member according to claim 1, wherein about 5 to about 10 percent of said fibers are oriented at approximately 90° relative to the axis of the tubular member.

6. A composite tubular member according to claim 1, wherein about 5 to about 10 percent of said fibers are oriented such that the Poisson ratio of the composite tubular member is approximately 0.5.

7. A composite tubular member according to claim 1, wherein said fibers are formed of materials selected from the group consisting of graphites, glasses, ceramics, and polymers.

8. A composite tubular member according to claim 1, wherein said impermeable material is selected from the group consisting of teflon, nylon, and rilsan.

9. A composite tubular member according to claim 1, wherein the binder is formed of materials selected from the group consisting of vinyl ester and epoxy.

10. A composite tubular member extending along an axis, said composite tubular member comprising
- A) a tubular composite layer containing multiple plies of cross-plied fibers contained within a binder for holding together said plies of fibers and said fibers, said composite layer including
  - a first ply containing fibers oriented at approximately 90° relative to the axis of the tubular member, and
  - a second ply positioned radially inward from said first ply and containing fibers oriented at ±40° to ±70° relative to the axis of the tubular member, and
- B) a substantially impermeable material lining the inner surface of said composite tubular member thereby forming a pressure chamber.

11. A composite tubular member according to claim 10, further comprising an abrasion resistant outer cover covering said composite layer.

12. A composite tubular member according to claim 10, wherein said fibers are formed of materials selected from the group consisting of graphites, glasses, ceramics, and polymers.

13. A composite tubular member according to claim 10, wherein said impermeable material is selected from the group consisting of teflon, nylon, and rilsan.

14. A composite tubular member according to claim 10, wherein the binder is formed of materials selected from the group consisting of vinyl ester and epoxy.

15. A composite tubular member according to claim 10, further comprising an energy conductor integrally positioned within said composite layer and extending along the axis.

16. A composite tubular member extending along an axis, said composite tubular member comprising
- a tubular composite layer containing cross-plied fibers contained within a plastic binder for holding together said fibers,
- a substantially impermeable material lining the inner surface of said composite tubular member thereby forming a pressure chamber, and
- an energy conductor integrally positioned within said composite layer and extending along the axis.

17. A composite tubular member according to claim 16, wherein said energy conductor is selected from the group consisting of electrical conductors and optical fibers.

18. A composite tubular member according to claim 16, including an insulative covering surrounding said energy conductor.

19. A composite tubular member according to claim 16, wherein about 90 to about 95 percent of said fibers are oriented at approximately ±40° to approximately ±70° relative to the axis of the tubular member.

20. A composite tubular member according to claim 16, wherein about 90 to about 95 percent of said fibers are oriented at approximately ±55° relative to the axis of the tubular member.

21. A composite tubular member according to claim 16, wherein said plastic binder is formed of materials selected from the group consisting of vinyl ester and epoxy.

22. A composite tubular member according to claim 16, further comprising an abrasion resistant outer cover covering said composite layer.

23. A composite tubular member according to claim 16, wherein said fibers are formed of materials selected from the group consisting of graphites, glasses, ceramics, and polymers.

24. A composite tubular member according to claim 16, wherein said impermeable material is selected from the group consisting of teflon, nylon, and rilsan.

25. A composite tubular member according to claim 16, wherein about 5 to about 10 percent of said fibers are oriented at approximately 90° relative to the axis of the tubular member.

* * * * *

UNITED STATES PATENT AND TRADEMARK OFFICE
CERTIFICATE OF CORRECTION

PATENT NO. : 5,913,337
DATED : June 22, 1999
INVENTOR(S) : Williams et al.

It is certified that error appears in the above-identified patent and that said Letters Patent is hereby corrected as shown below:

On the Title Page

Please correct:

[73] Assignee:   Fiber Spar and Tube Corporation

Col. 2, line 38, after "hose which", delete "."
Col. 3, line 39, change "individuallyencapsulated" to -- individually encapsulated --
Col. 5, line 6, after "view of", delete "."
Col. 10, line 25, change "member. in each" to -- member. In each --
Col. 14, line 57, change "the proper. zone" to -- the proper zone --
Claim 1, col. 15, line 57, insert -- a -- before "substantially impermeable"

Signed and Sealed this

Twenty-second Day of May, 2001

*Attest:*

NICHOLAS P. GODICI

*Attesting Officer*   Acting Director of the United States Patent and Trademark Office